(12) United States Patent
Chen

(10) Patent No.: US 7,846,065 B2
(45) Date of Patent: Dec. 7, 2010

(54) TORQUE CONVERTER CLUTCH CONTROL

(75) Inventor: Gang Chen, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 557 days.

(21) Appl. No.: 11/866,436

(22) Filed: Oct. 3, 2007

(65) Prior Publication Data
US 2009/0093339 A1    Apr. 9, 2009

(51) Int. Cl.
*F16H 61/14* (2006.01)

(52) U.S. Cl. .................................. 477/168; 477/174

(58) Field of Classification Search .................. 477/53, 477/54, 57, 62, 168
See application file for complete search history.

(56) References Cited

U.S. PATENT DOCUMENTS 5,762,581 A * 6/1998 Kozaki et al. ............... 477/174
6,928,357 B2   8/2005 Higashimata et al.

* cited by examiner

*Primary Examiner*—Sherry L Estremsky
*Assistant Examiner*—Edwin A. Young
(74) *Attorney, Agent, or Firm*—Ralph E. Smith

(57) ABSTRACT

A powertrain for a vehicle includes an engine having an output and a transmission selectively driven by the output of the engine. A torque converter is disposed between the engine and the transmission for selectively coupling the output of the engine to the transmission. A controller is in communication with the engine and the torque converter and controls a pressure within the torque converter based on an input parameter supplied to the engine.

16 Claims, 3 Drawing Sheets

TORQUE CONVERTER CLUTCH CONTROL

FIELD

The present invention relates to control systems and more particularly to a control system for a torque converter.

BACKGROUND

Vehicles incorporating an automatic transmission typically include a torque converter disposed between the automatic transmission and an engine of the vehicle. In a first mode, the torque converter transmits rotational energy from the engine to the transmission to allow the transmission to rotate wheels of the vehicle. In a second mode, the torque converter receives rotational energy from the engine but prevents such energy from rotating the transmission and, thus, the wheels of the vehicle. The torque converter essentially acts as a fluid coupling between the engine and the transmission that allows the engine to drive the wheels of the vehicle via the transmission in the first mode while allowing the engine to continue running without driving the wheels of the vehicle (i.e., when the vehicle is stopped, for example) in the second mode.

The input to the torque converter from the engine rotates generally at a higher speed than an output of the torque converter. For example, a conventional torque converter may include an impeller directly driven by the engine and a turbine coupled to an input of the transmission and rotatably driven by movement of fluid within the torque converter caused by rotation of the impeller. The impeller typically rotates at a higher speed than the turbine during operation. This difference in speed between impeller and turbine is referred to as "slippage," which directly affects performance of the vehicle, as the slippage rate dictates how far an accelerator must be depressed prior to a vehicle being moved from rest, for example. The degree of slippage may be controlled by selectively applying a force to a converter clutch disposed within the torque converter, which, when applied, causes rotational speed of the impeller to more closely approximate that of the turbine. Generally speaking, a high degree of slippage indicates a high torque transfer and a high torque multiplication. Such high slippage also results in high energy losses due to the friction loss associated with directing fluid from the impeller towards the turbine when operating at high speeds.

Conventional control systems may be used in conjunction with a torque converter to apply a form of feedback control. For example, a feedback control system using an error signal that measures slip across the converter clutch may be used to control a pressure of fluid disposed within the torque converter and, thus, the degree to which the converter clutch is applied. While conventional control systems adequately control slip between the impeller and the turbine, conventional control systems mainly employ feedback control and therefore are typically slow to react to a change in driving conditions.

For example, when an accelerator is depressed, the error measured across the converter clutch (i.e., the difference in speed between the impeller and turbine) is great relative to the desired slip speed. As such, some time is required to allow oil pressure to sufficiently build up within the torque converter and exert a force on the converter clutch to allow the turbine speed to approximate that of the impeller to drive the transmission and, thus, the turbine, at a desired slip speed. This increased time results in a delay in acceleration of the vehicle and/or an oscillation in slip speed, and therefore reduces the performance and efficiency of the torque converter and vehicle.

SUMMARY

A powertrain for a vehicle includes an engine having an output and a transmission selectively driven by the output of the engine. A torque converter is disposed between the engine and the transmission for selectively coupling the output of the engine to the transmission. A controller is in communication with the engine and the torque converter and controls a pressure within the torque converter based on an input parameter supplied to the engine.

A method of controlling a vehicle includes detecting a torque demand on an engine of the vehicle, generating a signal based on the torque demand, and supplying the signal to a control valve. The method further includes operating the control valve based on the supplied signal, supplying fluid to a torque converter associated with the engine based on the opening of the valve, and driving a transmission based on an output of the torque converter to propel the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
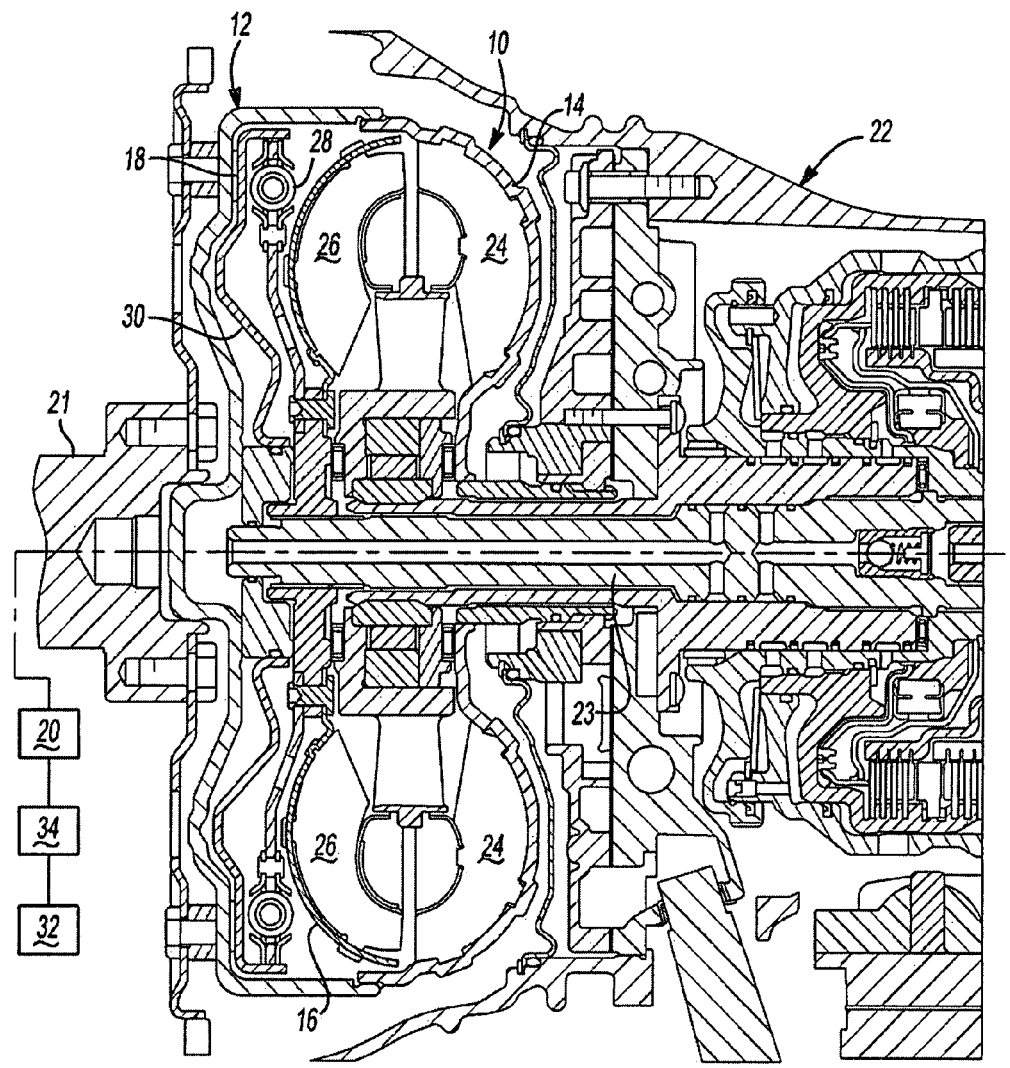
FIG. 1 is a partial cross-sectional view of a torque converter associated with a transmission and a vehicle engine.

The following description of the preferred embodiment(s) is merely exemplary in nature and is in no way intended to limit the invention, its application, or uses.

A torque converter 10 is provided and includes a housing 12, an impeller 14, a turbine 16, and a clutch 18. The housing 12 is rotatably driven by an engine 20 and selectively transmits rotational energy received from the engine 20 to a transmission 22 via the impeller 14, turbine 16, and clutch 18. In one mode of operation, the torque converter 10 receives rotational energy from the engine 20 and transfers the rotational energy to drive the transmission 22 via the impeller 14, turbine 16, and clutch 18 to propel a vehicle (not shown) at a desired speed.

As shown in FIG. 1, the housing 12 is fixed for rotation with the impeller 14 such that when the housing 12 is rotated by the engine 20, the impeller 14 is concurrently rotated therewith. Conversely, the turbine 16 is fixed for rotation with an input to the transmission 22 and is therefore not directly coupled to the impeller 14. Rotation of the turbine 16 and clutch 18 is accomplished when the housing 12 and impeller 14 are rotated and the rotational energy of the impeller 14 is transferred to the turbine 16 via a fluid medium, such as, but not limited to, oil or transmission fluid. Rotation of the turbine 16 and clutch 18 may also be accomplished when the clutch 18 is either fully engaged with the housing 12 (i.e., directly attached to the housing 12 for rotation therewith) or positioned in close proximity to the housing 12. In either configuration, rotational energy from the impeller 14 is transferred to the turbine 16 at least partially by the clutch 18 acting on or near the housing 12.

The impeller 14 includes a series of blades 24 that circulate fluid within the torque converter 10. The turbine 16 similarly includes a series of blades 26 that receive fluid from the impeller 14 and cause rotation of the turbine 16 relative to the impeller 14 when the impeller 14 is rotatably driven by the engine 20.

When the housing 12 is rotated by the engine 20, the impeller 14 is concurrently rotated therewith such that the blades 24 of the impeller 14 impart a force on the fluid disposed within the torque converter 10. The force applied to the fluid causes the fluid to move generally away from the impeller 14 and towards the turbine 16. Sufficient movement of the fluid away from the impeller 14 and towards the turbine 16 causes the turbine 16 to rotate. Because the turbine 16 is rotated under fluid force received from the impeller 14, the impeller 14 and the turbine 16 act as a "fluid coupling" between an output 21 of the engine 20 and an input 23 of the transmission 22.

The clutch 18 is attached to the turbine 16 via a damper 28 that connects the clutch 18 to the input 23 of the transmission 22. The clutch 18 selectively engages a clutch piston or bracket 30, which is fixed for rotation with the damper 28. When the clutch 18 is fixed for engagement with the bracket 30, the clutch 18 is fixed for rotation with the housing 12 and impeller 14. Because the clutch 18 is fixed for rotation with the turbine 16 (i.e., through the damper 28), the turbine 16 is similarly fixed for rotation with the housing 12 and impeller 14 when the clutch 18 is fixed for rotation with the bracket 30 and housing 12.

Movement of the clutch 18 within the torque converter 10 is accomplished by regulating the pressure of fluid disposed within the torque converter 10. For example, the pressure within the torque converter 10 may be regulated by increasing the volume of fluid within the torque converter 10 to selectively move the clutch 18 towards the housing 12. When the clutch 18 is moved in close proximity to the bracket 30, the turbine 16 rotates at a speed that approximates the speed of the impeller 14. In other words, the closer the clutch 18 is to the housing 12, the closer the rotational speed of the turbine 16 approximates that of the impeller 14. When the clutch 18 is fully engaged with the housing 12, such that the clutch 18 is fixed for rotation with the housing 12, the speed of rotation of the turbine 16 is substantially identical to that of the housing 12 and impeller 14.

As noted above, the pressure acting on the clutch 18 generally dictates the speed of the turbine 16 relative to the impeller 14 (i.e., the slip speed). For example, when the pressure within the torque converter 10 is high, the impeller 14 more closely approximates the speed of the turbine 16 due to the proximity of the clutch 18 to the housing 12 and the inertial forces acting on the transmission 22.

The energy imparted on the impeller 14 by the engine 20 is transferred to the turbine 16 via a fluid medium (i.e., the fluid disposed within the torque converter 10), some of the energy imparted on the fluid by the impeller 14 is lost due to friction and heat associated with the rotating impeller 14 and moving fluid. Therefore, the turbine 16 typically rotates at a slower speed when compared to the rotational speed of the impeller 14. This difference in rotational speed between the impeller 14 and the turbine 16 is referred to as "slip." Applying a force to the clutch 18 such that the clutch 18 moves in close proximity to the housing 12 reduces the slip across the torque converter 10 and causes the impeller 14 to approximate the rotational speed of the turbine 16. When the clutch 18 is fully engaged with the housing 12, the turbine 16 is essentially fixed for rotation with the impeller 14 and therefore rotates at substantially the same speed as the impeller 14. When the turbine 16 is fixed for rotation with the impeller 14, the torque converter 10 is operating in a "zero-slip" state.

With continued reference to FIG. 1, operation of the torque converter 10 will be described in detail. When a vehicle (not shown) is initially started, the vehicle is at rest and the engine 20 is providing a rotational output. The rotational output is received by the housing 12 and causes the housing 12 and impeller 14 to rotate. Rotation of the housing 12 and impeller 14 applies a force on the fluid disposed within the torque converter 10 via the blades 24 of the impeller 14. If the vehicle is at idle and brakes (not shown) of the vehicle are applied, the rotational energy supplied to the housing 12 and impeller 14 does not cause sufficient rotation of the turbine 16 to overcome the force applied to wheels (not shown) of the vehicle and the vehicle remains at rest.

When an accelerator 32 is depressed, a greater torque demand is required of the engine 20. A throttle 34 of the engine 20 responds to the increased torque demand and causes the output of the engine 20 to be increased. Increasing the output of the engine 20 causes the housing 12 and impeller 14 to rotate at greater speeds. The increased rotational speed of the impeller 14 similarly causes the blades 24 to rotate at a higher speed and impart a greater force on the fluid disposed within the torque converter 10. The increased force applied to the fluid causes the fluid to further rotate the turbine 16 and propel the vehicle. At this point, the vehicle will be driven forward unless a sufficient force is applied to the brakes to maintain the vehicle at rest.

Assuming the brakes are released and the depression of the accelerator 32 causes the vehicle to move forward, slippage between the impeller 14 and turbine 16 is experienced such that energy is lost in transferring fluid force from the impeller 14 to the turbine 16. To mitigate these losses, more fluid may be introduced into the torque converter 10 to apply pressure on the clutch 18 and cause the clutch 18 to move into close proximity to the housing 12.

As described above, movement of the clutch 18 into close proximity with the housing 12 causes the turbine 16 to more closely mimic the rotational speed of the impeller 14. Allowing the turbine 16 to mimic the rotational speed of the impeller 14 allows the vehicle to be more responsive to engine speed and to operate more efficiently.

Figure 2:
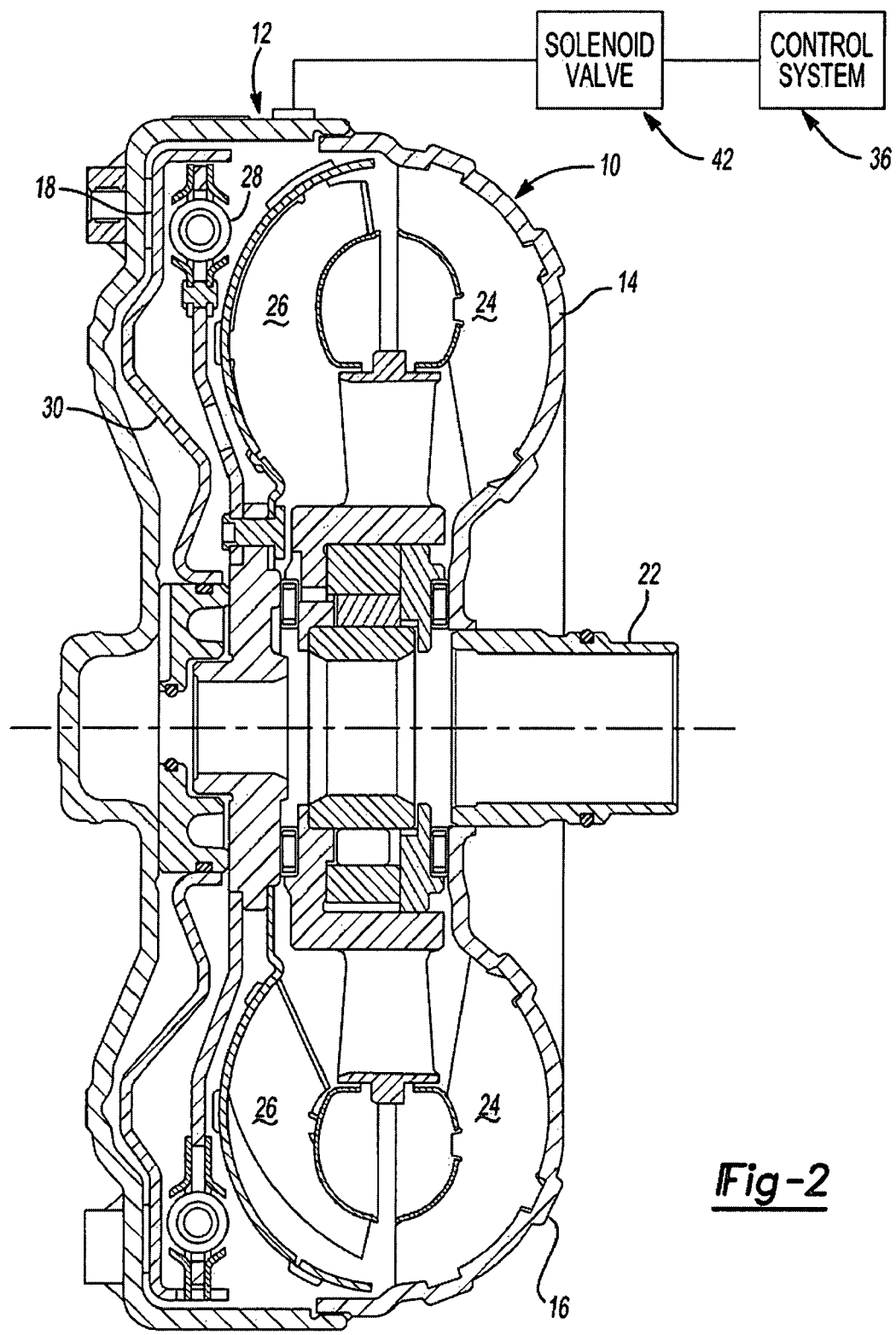
FIG. 2 is a partial cross-sectional view of the torque converter of FIG. 1 in communication with a control system in accordance with the principles of the present teachings.
Figure 3:
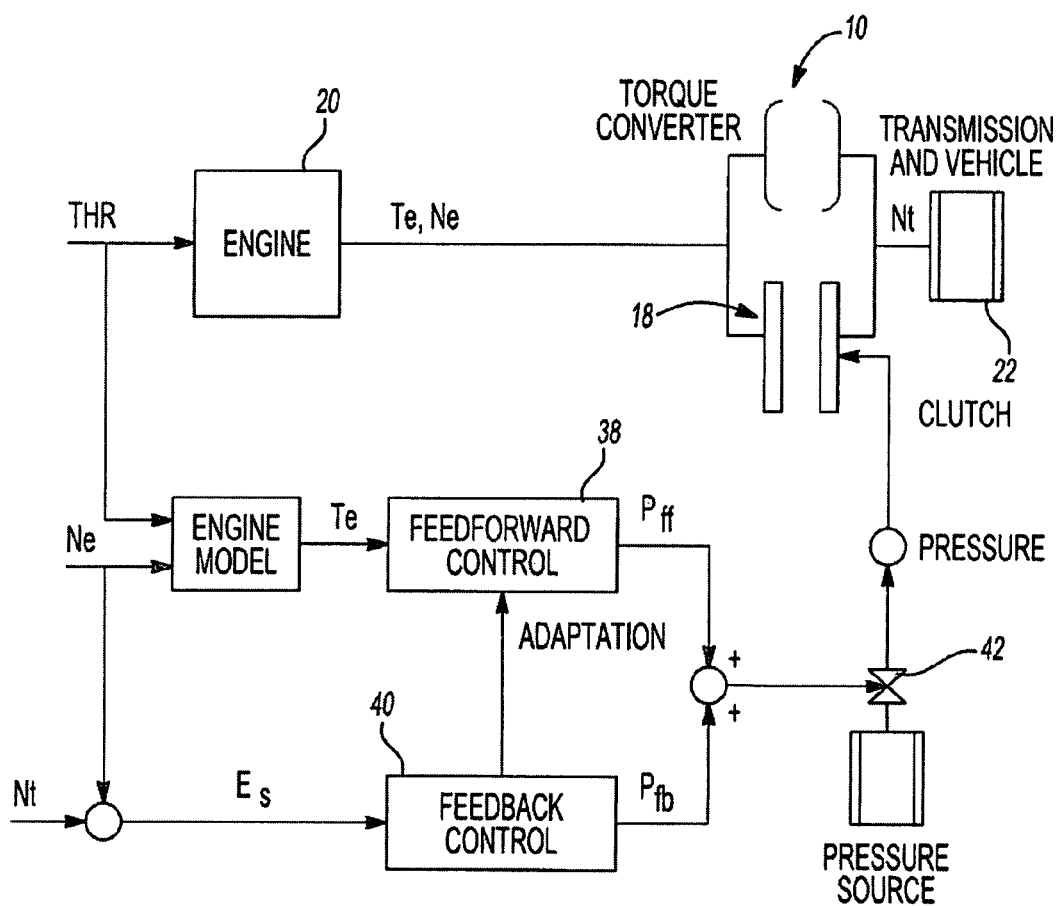
FIG. 3 is a schematic representation of the control system of FIG. 2.

With particular reference to FIG. 2, a control system 36 is provided for use with the torque converter 10. The control system 36 includes a feed-forward module 38 and a feedback module 40. The feed-forward module 38 and feedback module 40 cooperate to provide an output signal for controlling a valve 42. The valve 42 may be a solenoid valve such as, for example, a variable-force solenoid (VFS) or a pulse-width modulated (PWM) solenoid. Controlling the valve 42 directly controls the volume of fluid supplied to the torque converter 10, and thus, controls the pressure within the torque converter 10 to control the proximity of the clutch 18 relative to the housing 12.

The feed-forward module 38 attempts to mitigate a delay between depression of the accelerator 32 and the torque required to maintain the same amount of slippage when the engine speed increases (i.e., caused by depression of the accelerator 32) by estimating the required pressure of fluid needed within the torque converter 10 based on a position of the accelerator 32. When the accelerator 32 is initially depressed, a volume of fluid enters the torque converter 10 and applies a force on the bracket 30. Because the force applied to the turbine 16 from the impeller 14 and movement of the clutch 18 into close proximity to the housing 12 is largely dependent on the pressure of fluid disposed within the torque converter 10, there may be a delay between depression of the accelerator 32 and the torque required to compete with the increasing engine torque.

The feed-forward module 38 attempts to mitigate this delay by anticipating the required pressure within the torque converter 10 based on the angle (i.e., the depression) of the accelerator 32. While the angle of the accelerator 32 will be described hereinafter, the feed-forward module 38 may use other vehicle operating parameters that provide an indication of the torque demand on the engine 20. For example, the feed-forward module 38 may receive information regarding the position of the throttle 34, which indirectly supplies information as to the angular position of the accelerator 32.

Once the feed-forward module 38 receives information as to the torque demand on the engine 20, either from the position of the accelerator 32 and/or the position of the throttle 34, the feed-forward module 38 may estimate the requisite pressure needed within the torque converter 10 to achieve a desired torque capacity of the torque converter 10 and maintain the slip across the impeller 14 and turbine 16.

Anticipating the pressure required within the torque converter 10 quickly reduces slip between the turbine 16 and the impeller 14 by exerting a force on the clutch 18 via the added fluid. For example, if the vehicle is traveling at a relatively low speed and the accelerator 32 is depressed such that a large increase in speed and, thus, a large increase in torque demanded on the engine 20 are required, a great difference in rotational speed between the impeller 14 and turbine 16 is experienced. When the vehicle is operating at the lower speed, the slip between the impeller 14 and the turbine 16 is greater than when the vehicle is operating at a higher speed. The difference in slip between the impeller 14 and turbine 16 may be overcome by supplying the torque converter 10 with an increase in fluid generally within the torque converter 10.

This increase in fluid applies a force to the clutch 18 and allows the clutch 18 to move into close proximity with the housing 12, thereby allowing the turbine 16 to rotate at a speed that more closely approximates the impeller 14. Anticipating the volume of fluid required within the torque converter 10 to sufficiently move the clutch 18 into proximity with the bracket 30 to achieve a desired slip between the impeller 14 and the turbine 16 allows the vehicle to operate more efficiently and directly respond to depression of the accelerator 32.

The feedback module 40 works in conjunction with the feed-forward module 38 to "fine tune" the estimation performed by the feed-forward module 38. The feedback module 40 may receive the slip speed between the impeller 14 and turbine 16 and output an error. The output error may be fed into the feed-forward module 38 to adjust the amount of fluid within the torque converter 10. The signal output from the feedback module 40 may be a proportional, integral, derivative (PID) signal that continuously varies the duty cycle of the valve 42.

The following summarizes operation of the feed-forward module 38 and feedback module 40 and provides algorithms for use by both modules 38, 40 in controlling the torque converter 10. During operation of the torque converter 10, the turbine 16 is engaged with the transmission 22. Therefore, the inertia of the turbine 16 can be assumed as an infinite when compared with that of the engine 20. When pressurized fluid is supplied to the torque converter 10 to engage and release the clutch 18, controlling the slip speed indirectly controls the engine speed. The following equation demonstrates that any acceleration change of the engine 20 is equal to a difference between engine torque and the sum of the torque converter transmitted torque and clutch torque.

$$T_e - T_t - T_{cc} = (I_e + I_t)\alpha_e$$

Solving for the torque of the clutch 18, yields the following relationship.

$$T_{cc} = T_e - T_t - (I_e + I_t)\alpha_e$$

The above relationship demonstrates that the torque in the clutch 18 is equal to the engine torque ($T_o$) minus the torque transmitted by the torque converter ($T_t$) and engine turbine inertia torque ($1_e\alpha_e$). The clutch torque capacity at given clutch pressure is given by the following relationship, where $\mu_f$ is the friction coefficient of the friction material, $R_f$ is the effective radius of the friction material, and $A_f$ is the friction material area.

$$T_{cc} = \mu_f R_f A_f P_{cc}$$

During control of the torque converter 10, a duty cycle of the valve 42 can be continuously modulated to adjust the pressure exerted on the clutch 18 to control the torque of the clutch 18. The following relationship provides an expression that yields the clutch torque.

$$P_{cc} = \frac{T_e - T_t}{\mu_f R_f A_f} + \frac{I_e + I_t}{\mu_f R_f A_f} \frac{e_s}{\Delta t}$$

From above equations, we can see that the duty cycle control of the valve 42 for the clutch pressure is not only dependent on the slip speed error (i.e., the error between the impeller 14 and the turbine 16), but also must include the engine torque and torque converter torque. If engine throttle data is used to predict the engine and torque converter torques, the first term $$\left(\frac{T_e - T_t}{\mu_f R_f A_f}\right)$$

in the above equation for clutch torque ($P_{cc}$) is a feed forward control term and the second term $$\left(\frac{I_e + I_t}{\mu_f R_f A_f} \frac{e_s}{\Delta t}\right)$$

is a feedback control term that accounts for an inertia ($I_t$) of the housing (12) and impeller (14), as well as a desired acceleration ($e_s/\Delta t$). The first term may be used by the feed-forward module 38 while the second term may be used by the feedback module 40.

The feed forward module 38 is an anticipatory control to reduce system delay, as described above. The feedback module 40 determines a slip error based on an error between a current operating slip and a desired slip required to produce a desired clutch pressure on the clutch 18. The feedback module 40 may generate a signal that is used to vary the slip speed and is fed back to the feed-forward module 38 to enhance stability of the duty cycle signal supplied to the valve 42.

During steady state, the feedback module 40 may employ PID control to continuously adjust the slip error without considering the engine torque and torque converter torque. However, the system delay would inevitably cause slip speed swing and oscillating during periods of transient operations.

To improve control quality, engine and torque converter torques should be taken into consideration. One algorithm for controlling the torque converter 10 is provided below.

The first step in controlling the torque converter 10 is to calculate the slip error using the following equation.

$$N_s = N_e - N_t N_{ds} = f(THR, N_t),\ e_s = N_s - N_{ds}$$

Once the slip error is determined, the minimum fluid pressure for application on the clutch 18 can be determined using the following relationship when the clutch 18 is at or about the zero point (i.e., when the torque converter 10 is operated solely by fluid pressure and not by movement of the clutch 18 into engagement with or close proximity to the housing 12) where $T_{em}$ is a temperature of the fluid disposed within the torque converter 10.

$$P_{min} = P_{ffad}(0, T_{em}) + P_{offset}(N_t)$$

The bypass clutch torque may be determined by the following expression, where $T_{con}$ is the torque-converter torque.

$$T'_{cc} = T_{eng} - T_{con}(N_e, N_t)$$

A correction for the clutch torque during periods of idle or steady-state part throttle is provided by the following equation.

$$T_c = T_{eng} - T_{con}(N_e, N_t)$$

Finally, the corrected clutch torque is a follows.

$$T_{cc} = T'_{cc} - T_c$$

The anticipated clutch torque may then be determined by the following relationship.

$$T_{antcc} = T_{eng} + K_{tt}\frac{\Delta THR}{THR} - T_{con}(N_{ds}, N_t)$$

The anticipated clutch torque may then be applied to the torque converter 10 to drive the torque converter 10 at a desired slip speed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A powertrain system for a vehicle, the powertrain system comprising:
    an engine having an output;
    a transmission selectively driven by said output of said engine;
    a torque converter disposed between said engine and said transmission for selectively coupling said output of said engine to said transmission;
    a valve in fluid communication with said torque converter and operable to control a fluid flow to adjust a pressure within said torque converter; and
    a control system in communication with said valve, said engine and said torque converter, said control system including a feed-forward module and a feedback module, said feed-forward module being operable to anticipate a first volume of fluid necessary to have a desired effect on said pressure based on an input parameter supplied to said engine and provide a first signal to said valve indicative of said first volume, said feedback module generating and providing a second signal to said feed-forward module to adjust a slip speed of said torque converter.

2. The powertrain system of claim 1, wherein said input parameter is a position of an accelerator.

3. The powertrain system of claim 1, wherein said input parameter is a position of a throttle associated with said engine.

4. The powertrain system of claim 1, wherein said feedback control module continuously modulates a pressure within said torque converter.

5. The powertrain system of claim 4, wherein at least one of said first signal and said second signal is a PID feedback control signal.

6. The powertrain system of claim 1, wherein said feed-forward module and said feedback module cooperate to provide an output signal to said valve.

7. The powertrain system of claim 1, wherein said second signal is based on an inertia of a housing and impeller of said torque converter.

8. The powertrain system of claim 1, wherein at least one of said first and second signals is based on a desired acceleration of the vehicle.

9. A method of controlling a vehicle, the method comprising:
    detecting a torque demand on an engine of the vehicle;
    generating a first feed-forward signal based on said torque demand;
    supplying said first feed-forward signal to a control valve;
    operating said control valve into a first position based on said first feed-forward signal to adjust a volume of fluid disposed within a torque converter to a first volume;
    supplying fluid to a torque converter associated with said engine via said control valve;
    generating an error signal based on a comparison of a measured slip of said torque converter and a desired slip;
    generating a second feed-forward signal based on said torque demand and said error signal;
    operating said control valve in a second position based on said second feed-forward signal to adjust said volume of fluid disposed within said torque converter to a second volume different than said first volume; and
    driving a transmission based on an output of said torque converter to propel the vehicle.

10. The method of claim 9, wherein said detecting said torque demand on said engine includes determining a position of an accelerator.

11. The method of claim 9, wherein said detecting said torque demand on said engine includes determining a position of an engine throttle.

12. The method of claim 9, further comprising providing a PID signal to said control valve to cycle said control valve between an open position and a closed position at a predetermined duty rate.

13. The method of claim 9, wherein said adjusting said volume of fluid disposed within said torque converter includes supplying additional fluid to said converter to increase a pressure within said torque converter and selectively engage a clutch.

14. The method of claim 9, further comprising generating a feedback control signal based on said measured slip.

15. The method of claim 9, wherein generating said second feed-forward signal includes compensating for an inertia of a housing and impeller of said torque converter.

16. The method of claim 9, wherein at least one of said first and second feed-forward signals is based on a desired acceleration of the vehicle.

* * * * *